United States Patent Office 3,534,001
Patented Oct. 13, 1970

1

3,534,001
HIGH MOLECULAR WEIGHT FLEXIBLE POLYUREAS
Constantine J. Bouboulis, Union, and William E. Wellman, Edison, N.J., assignors to Esso Research and Engineering Company, a corporation of Delaware
No Drawing. Filed May 5, 1967, Ser. No. 636,251
Int. Cl. C08g 22/02
U.S. Cl. 260—77.5        11 Claims

ABSTRACT OF THE DISCLOSURE

High molecular weight polyureas useful as fiber forming materials and moldable compositions are prepared by reacting together a hindered dicarboxylic acid such as 2,2,5,5-tetramethyl adipic acid or 2,2,6,6-tetramethyl pimelic acid and a diamine/urea reaction mixture.

BACKGROUND OF THE INVENTION

This invention relates to flexible high molecular weight polyureas and the process of making them. More specifically, it relates to polyureas prepared in the presence of sterically hindered dicarboxylic acids.

Polyurea plastics are known in the art as fiber forming materials and as moldable compositions. They have been produced, for example, by a three-step heating of primary diamine compounds with urea in approximately equimolar proportions or with a slight excess of the diamine compound; see for example U.S. 3,119,793, issued on Jan. 28, 1964.

A particularly suitable method of preparing polyureas is disclosed in patent application S.N. 497,560 of Kirshenbaum et al., filed Oct. 18, 1965, now U.S. Pat. 3,390,137 wherein excess diamines, e.g. 1.8:1 to 3.0:1 mole ratio of diamine to urea, is used to eliminate premature solidification and crosslinking of these polyureas which occurs in the latter heating stages of the prior art processes. This disclosure is incorporated herein by reference.

Novel polyurea compositions are disclosed in British Pat. No. 773,964 issued May 1, 1957, to Inaba et al. wherein dicarboxylic acids are incorporated in the reaction mixture. Typical of the dicarboxylic acids disclosed therein are aliphatic acids such as adipic and azelaic acid.

Regardless of the prior art method used to produce polyureas, the product invariably has an inherent viscosity ($\eta_{inh}$) less than 1.00. Inherent viscosity of a polymer is a measurement of flow which is directly correlated to molecular weight; i.e., the higher the inherent viscosity ($\eta_{inh}$) the higher the molecular weight. The term is defined by the equation:

$$\eta_{inh} = \frac{\log_e \frac{\text{Solution flow time in seconds}}{\text{Solvent flow time in seconds}}}{C \text{ in grams}/100 \text{ ml.}}$$

wherein C=concentration of polymer in solution and m-cresol is used as the solvent. Measurements are made with a 0.5 wt. percent solution of the polymer in the solvent at a temperature of 25° C. A complete description of the method may be found in Preparative Methods of Polymer Chemistry, W. R. Sorenson and Tod W. Campbell, Interscience Publishers, Inc., New York, 1961.

SUMMARY OF THE INVENTION

It has now been found surprisingly that particular dicarboxylic acids when used in the synthesis of polyureas result in a product with inherent viscosities greater than 1.00.

The essence of this invention is the discovery that by utilizing from 3 to 50 mole percent of a tatra-substituted hindered dicarboxylic acid, based on the moles of urea and diacid, in the reaction mixture successfully supresses crosslinking reactions so that polyureas with inherent viscosities in excess of 1.00 can be prepared.

Specifically, the improved products of this invention are obtained by reacting an excess of at least one diamine with urea, or a urea compound, or mixtures thereof, and a tetra-substituted sterically hindered dicarboxylic acid.

DETAILED DESCRIPTION

The hindered dicarboxylic acids which are suitable for this process have the structural formula:

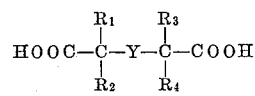

wherein $R_1$, $R_2$, $R_3$ and $R_4$ are the same or different alkyl groups of 1–5 carbon atoms and Y is selected from the group consisting of —$(CH_2)_n$— with $n=2–20$,

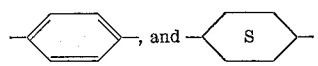

Typical of these hindered dicarboxylic acids are 2,2,5,5-tetramethyladipic acid; 2,2,6,6-tetramethylpimelic acid; 2,2,9,9 - tetramethylsebacic acid; $\alpha,\alpha,\alpha',\alpha'$-tetramethyl-p-phenylenediacetic acid; $\alpha,\alpha,\alpha',\alpha'$-tetramethyl-1,4-cyclohexanediacetic acid; and 2,2,5,5-tetraethyladipic acid. The preferred hindered dicarboxylic acids useful in the practice of this invention are 2,2,6,6-tetramethylpimelic acid and 2,2,5,5-tetramethyladipic acid. The most preferred is 2,2,6,6-tetramethylpimelic acid.

A method for the preparation of $\alpha,\alpha,\alpha',\alpha'$-tetramethyl-p-phenylenediacetic acid is described in patent application S.N. 635,350 of Taranko et al., filed May 2, 1967, assigned to Esso Research and Engineering Company, which application is incorporated herein by reference. That application is directed to a process for alkylating nitriles from which the corresponding acids may be derived. For example, p-phenylenediacetonitrile is reacted with chloromethane in the presence of a sodium hydroxide solution, the reactants being dissolved in dimethyl sulfoxide. The product is $\alpha,\alpha,\alpha',\alpha'$-tetramethyl-p-phenylenediacetonitrile. Hydrolysis of this hindered nitrile with potassium hydroxide in a solution of ethylene glycol followed by acidification of the hydrolyzate yields the desired acid. The corresponding saturated compound, $\alpha,\alpha,\alpha',\alpha'$-tetramethyl-1,4-cyclohexane-diacetic acid, may be prepared by hydrogenation of the tetramethyl-p-phenylenediacetic acid.

It has been found that all four alpha hydrogens of the dicarboxylic acid must be substituted by $C_1$–$C_5$ alkyl groups in order to produce products of high molecular weight (inherent viscosity) which are essentially free of crosslinking. Crosslinking results in an intractable polymer of little utility and is evidenced by the fact that the polymer is insoluble and infusible.

The diamines utilized in preparing the novel polyureas of the present process can arbitrarily be classified into acyclic diamines and cyclic diamines. The acyclic diamines utilized in the present process are selected from the group consisting of $C_5$–$C_{18}$ $\alpha,\omega$-alkylene diamines and the oxa, thia and aza homologs thereof and can be represented by the following empirical formula:

$$H_2N—R_1—NH_2$$

wherein $R_1$ is selected from the group consisting of:

(a)  —$(CH_2)_n$—

(b)  —$(CH_2)_m$—A—$(CH_2)_{m'}$ (c)  —$(CH_2)_m$—A—R'—A—$(CH_2)_{m'}$— wherein $n$ is a cardinal number of from 5 to 18, $m$ and $m'$ are each cardinal numbers of from 2 to 5, A is selected from the group consisting of oxygen, sulfur and

R' is a $C_1$–$C_5$ alkylene or oxaalkylene group, and R'' is selected from the group consisting of $C_1$–$C_5$ alkyl, $C_6$–$C_{10}$ aryl and $C_5$–$C_{12}$ cycloalkyl.

Specific examples of acyclic diamines include 1,5-pentanediamine, 1,6-hexanediamine, 1,8-octanediamine, 1,10-decanediamine, 1,12-dodecanediamine, 1,10-dimethyl-1,10-decanediamine, 6,6 - dimethyl-4,8-dioxa-1,11-undecanediamine, 4,7,10-trioxa-1,13-tridecanediamine, $\beta,\beta'$-diaminodiethylether, $\gamma,\gamma'$-diaminodipropylether, $\beta,\beta'$-diaminodiethylsulphide, $\gamma,\gamma'$-diaminodipropylsulphide, 4,7-dioxa-1,10-decanediamine, and N-methyl-N-bis ($\gamma$-propylamine). The preferred acyclic diamines are 1,6-hexanediamine, 4,7-dioxa-1,10-decanediamine, N-methyl-N-bis ($\gamma$-propylamine), 2,4,4-trimethyl-1,6-hexanediamine and 2,2,4-trimethyl-1,6-hexanediamine. The preferred acyclic diamines useful in the practice of this invention are 1,6-hexanediamine, 4,7,10-trioxa-1,13-tridecanediamine, 4,7-dioxa-1,10-decanediamine, 2,4,4-trimethyl - 1,6 - hexanediamine and 2,2,4-trimethyl-1,6-hexanediamine. The most preferred are 1,6-hexanediamine, 4,7,10-trioxa-1,13-tridecanediamine, and 4,7-dioxa-1,10-decanediamine.

The cyclic diamines utilized in the present process are selected from the group consisting of $C_8$–$C_{22}$ phenylene-bis(alkylamines), $C_8$–$C_{22}$ cyclohexylene-bis(alkylamines), and $C_4$–$C_{14}$ cyclobutylene-bis(alkylamines). These can be represented by the empirical formula:

$$H_2N—R_2—NH_2$$

wherein $R_2$ is selected from the group consisting of:

(d) $—(CH_2)_p—B—(CH_2)_{p'}—$ (e) $—(CH_2)_p—D—(CH_2)_{p'}—$ (f) $—(CH_2)_q—G—(CH_2)_{q'}—$ wherein $p$ and $p'$ are each cardinal numbers of from 1 to 6; $q$ and $q'$ are each cardinal numbers of from 0 to 3; B is selected from the group consisting of phenylenes, bisphenylenes, phenylene ethers, and $C_1$–$C_4$ alkyl substituted phenylenes such as tolylene and dimethylphenylene; D is selected from the group consisting of cyclohexylenes, cyclohexylene ethers and $C_1$–$C_4$ alkyl substituted cyclohexylenes; and G is selected from the group consisting of cyclobutylenes and $C_1$–$C_4$ alkyl substituted cyclobutylenes.

Representative examples of the cyclic diamines include: 4,4'-dodecahydrobiphenyl-bis (methylamine), 1,4-phenylene-bis ($\beta$-ethylamine), 1,3-phenylene-bis ($\beta$-ethylamine), 1,4 - phenylene-bis (methylamine), 1,3 - phenylene-bis (methylamine), 4,4'-biphenylene-bis (methylamine), 2,5-dimethyl-1,4-phenylene-bis (methylamine), and 2,5-dimethyl - 1,4 - phenylene - bis ($\beta$-ethylamine); 1,4-cyclohexane-bis (methylamine), 1,4-cyclohexane-bis ($\beta$-ethylamine), 1,3-cyclohexane-bis ($\beta$-ethylamine), 2,5-dimethyl-1,4-cyclohexane-bis ($\beta$-ethylamine), 2,5-dimethyl-1,4-cyclohexane-bis (methylamine); trans-1,2-cyclobutane-bis (methylamine), 1,3-cyclobutane-bis (methylamine), and mixtures thereof. Cyclic diamines having an ether group may be represented by the structures:

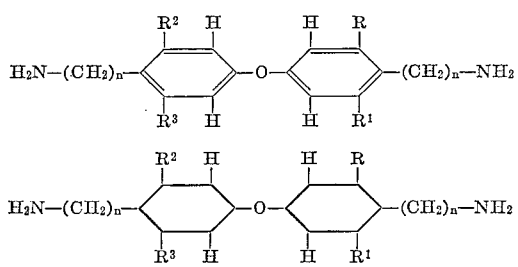

where $n=1$–$4$ and R, $R^1$, $R^2$ and $R^3$ are hydrogen, methyl, ethyl or propyl groups. The preferred cyclic diamines are 1,4-cyclohexane-bis ($\beta$-ethylamine), 1,4-phenylene-bis ($\beta$-ethylamine) and 1,3-phenylene-bis (methylamine). The most preferred cyclic diamines are 1,4-phenylene-bis ($\beta$-ethylamine) and 1,4-cyclohexane-bis ($\beta$-ethylamine) and mixtures thereof.

Suitable urea compounds include $C_1$–$C_8$ alkylene bisureas such as methylene bisurea, ethylene bisurea, etc., as well as thiourea and the $C_1$–$C_8$ alkylene bisthioureas such as methylene bisthiourea, ethylene bisthiourea, etc., and mixtures thereof. Preferably urea alone is employed in the reaction.

Conventional methods of preparing polyureas can be utilized in the practice of this invention. In particular the typical three-step heating of the reaction mixture is especially suitable; however, it should be understood that there may be an overlapping between the temperatures in each step and that the reaction temperatures may be raised gradually and continuously rather than stepwise.

The preferred stepwise procedure is as follows:

Step A

The reaction mixture of one or more diamine compounds with urea (or urea compounds or mixtures of urea and one or more urea compounds) and one or more tetra-substituted hindered dicarboxylic acids is heated, preferably with stirring and preferably in the presence of an inert gas at a temperature of about 90° C. to about 140° C. until the rate of ammonia evolution from the reaction mass had decreased markedly. Preferably, the temperature range is about 120° to about 130° C. The molar proportion of diamine to urea+acid may be from about 1:1 to about 3.0:1, preferably from about 1.2:1 to about 2.5:1. The mole percent of dicarboxylic acid based on urea or urea compound or mixtures thereof plus dicarboxylic acid is 5–50 mole percent, preferably about 8 to 30 mole percent, most preferably about 10 to about 20 mole percent. Suitable examples of inert gas which is introduced as a constant flow through or over the diamine-urea-diacid mixture to facilitate the removal of ammonia and to prevent oxidation, include nitrogen, carbon monoxide, water gas, etc. The inert gas pressure may be in the range of 0.5 to 100 atmospheres; preferably from 1 to 50 atmospheres. Most preferably, the gas pressure during this initial heating stage is between 1 and 10 atmospheres. If desired, 5–10 parts of water per 100 parts of urea (or urea compounds or mixtures of urea and urea compounds) may be added as a catalyst.

Step B

The intermediate compound in the preceding step is subjected to heating preferably with stirring at a temperature of about 140° to 200° C., preferably about 155° to 165° C. and a pressure in the same magnitude as that employed in Step A above. The water, if any, is distilled off in this step and heating is continued until deammoniation is essentially completed and a low molecular weight compound or prepolymer is obtained.

Step C

After the evolution of ammonia observed in Step B has essentially stopped, the low molecular weight compound or prepolymer thus obtained is thereafter heated at a temperature of about 200° to about 290° C., preferably about 250° to about 280° C., and a pressure of about 0.05 mm. of mercury to about 10 atmospheres, preferably about 0.05 mm. of mercury to about 1 atmosphere for a period of time sufficient to condense the prepolymer to a linear high molecular weight super-polymer; the heating period being about 2 to 36 hours, preferably 3 to 20 hours, most preferably 3.5 to 10 hours. The excess diamine is removed in this step, particularly at the initial stages of this step.

A variety of pigments, fillers, antioxidants, etc., may be added to the polyureas or to the reactants prior to completion of the reaction. If desired, a molecular weight stabilizer may be added, for example, an aliphatic monobasic acid, an alkyl monoamide, an alkyl monoamine, or an N-acylalkylenediamine, so as to convert the terminal functional groups of the polymer into alkyl groups. Preferably each alkyl group, acyl group or alkylene group in such stabilizers should have from 6 to 18 carbon atoms to the molecule. Effective stabilizers are palmitic acid, stearic acid, lauric acid, octylamine, nonylamine, etc. The stabilizer may be added in any reaction step prior to the completion of the third step set forth hereinbefore. Additionally, thermal and ultraviolet light stabilizers may be added.

The polyureas obtained according to the present invention have an inherent viscosity greater than 1.00 (e.g. 1.0 to 2.0), are hard, have excellent flexibility, comparatively high melting points (e.g. from about 180° to about 280° C.), high decomposition temperatures, good spinnability, and are excellent in molding applications. Molded articles formed therefrom have excellent physical properties such as comparatively high scratch resistance, good modulus and good impact resistance. Fibers formed thereof are good in dyeability and have excellent physical properties such as high tenacity, a good Young's modulus and a good elastic recovery.

If desired, the flexibility of the polyureas may be improved even further by treating them with 1 to 15 weight percent of a hydrogen bonding material such as a high molecular weight phenol, an organic phosphate, organic silicates, etc. Ordinarily, polyureas have a low temperature transition in the range of −30° to 0° C. The magnitude of this transition can be increased, thereby improving the impact resistance and ductibility of the polyurea with the aid of these hydrogen bonding materials; preferably the hydrogen bonding material is one which has a relatively high boiling point and low melting point. Preferred materials for use in improving the flexibility of polyureas include a multi-hydroxy compound such as glycerine, organic esters, phenyl phosphates, organic silicates, organosilanes, triisopropanolamine, and the like.

The invention may be more fully understood by reference to the following examples:

Examples 1–2.—These experiments were carried out using as the diamines, hexamethylenediamine (HMD), 4,7,10-trioxa-1,13-tridecanediamine (TOTD) and 2,2,6,6-tetramethylpimelic acid (TMPA) as the hindered dicarboxylic acid. The reactants were mixed at room temperature and a small amount of water added.

The reactants were placed in a polymer tube and heated under nitrogen for 4 hours at 125° C. and then for 3 hours at 160° C. During this period, ammonia was evolved. The temperature was finally raised to 270°–275° C. and vacuum was slowly applied. The polyurea was kept under a vacuum of 1–6 mm. Hg for about 1.35 hours during which period the excess diamine distilled off and the viscosity of the polymer increased to its final value. The reaction conditions, reactant ratios and results of the reaction are shown in Table I.

Examples 3–4.—In order to demonstrate the effect of hindered dicarboxylic acid on inherent viscosity, Example 3 was performed under identical conditions as Examples 1 and 2, except that the dicarboxylic acid used was adipic acid, an unhindered acid. Example 4 was performed with no dicarboxylic acid. In both cases the inherent viscosity was less than 1.00. These results are compared with Examples 1 and 2 in Table I.

Example 5.—Example 5 was run using the same reactants and conditions of Example 4, except that the sample was kept under a vacuum for 1.8 hours in an attempt to increase the inherent viscosity above 1.00. The polyurea crosslinked and as a result was insoluble and intractable.

The results of Table I indicate that when the reaction mixture contains a hindered dicarboxylic acid, the resultant polymer has an inherent viscosity greater than 1.00, whereas when the reaction does not contain a hindered dicarboxylic acid, the inherent viscosity is less than 1.00. An unhindered dicarboxylic acid has no effect on the inherent viscosity. Attempts to increase the inherent viscosity of a polymer which does not contain a hindered dicarboxylic acid by extended heating results in a crosslinked polymer which is insoluble and intractable.

TABLE I.—EFFECT OF HINDERED DICARBOXYLIC ACID ON MOLECULAR WEIGHT

| Example | Reactants | Presence of hindered dicarboxylic acid | Reaction conditions | | | Inherent viscosity of polymer |
|---|---|---|---|---|---|---|
| | | | Step A | Step B | Step C | |
| 1 | 0.200 mole HMD, 0.028 mole TOTD, 0.018 mole TMPA, 0.150 mole urea, 3 grams water | Yes | 125° C. for 4 hrs. | 160° C. for 3 hrs. | 270–275° C. for 1.35 hrs. 1–6 mm. Hg. | $\eta_{inh}$=1.64 |
| 2 | 0.200 mole HMD, 0.05 mole TOTD, 0.018 mole TMPA, 0.146 mole urea, 3 grams water | Yes | Same | Same | Same | $\eta_{inh}$=1.18 |
| 3 | 0.200 mole HMD, 0.028 mole TOTD, 0.025 mole adipic acid, 0.150 mole urea, 3 grams water | No | Same | Same | Same | $\eta_{inh}$=0.99 |
| 4 | 0.200 mole HMD, 0.050 mole TOTD, 0.150 mole urea, 3 grams water | No | Same | Same | Same | $\eta_{inh}$=0.96 |
| 5 | Same | No | Same | Same | 270–275° C. for 1.8 hrs. 1–6 mm. Hg. | Intractable, insoluble polymer. |

Example 6.—Following the procedure set forth in Example 1, 0.200 mole of HMD, 0.024 mole of TOTD, 0.018 mole of TMPA and 0.146 mole of urea were reacted in the presence of 3 grams of water. The resulting product had an inherent viscosity of 1.56.

Example 7.—In order to demonstrate the effect of molecular weight modifiers, 0.001 mole of stearic acid was added to 0.200 mole HMD, 0.036 mole TOTD, 0.018 mole TMPA and 0.158 mole urea. The mixture was reacted in the presence of 3 grams of water under the conditions set forth in Example 1. The polyurea formed had an inherent viscosity of 1.43.

Example 8.—A mixture of 0.110 mole of HMD, 0.026 mole trans-1,2-cyclobutane-bis (methylamine), 0.020 mole TMPA and 0.080 mole urea were reacted in the presence of 2 grams of water under the conditions set forth in Example 1. The polyurea formed had an inherent viscosity of 1.07.

The results of these experiments show that the use of a hindered dicarboxylic acid in a polyurea reaction mixture yields polymers of higher inherent viscosity than otherwise possible when the reaction is run without a dicarboxylic acid in the mixture or when the dicarboxylic acid is not a hindered acid. Since many different embodiments of this invention may be made without departing from the spirit and scope thereof, it is to be understood

What is claimed is:
1. In a process for preparing polyureas by reacting:
 (a) at least one diamine selected from the group consisting of aliphatic diamines, diamines containing an aromatic nucleus, diamines containing a cycloaliphatic nucleus and mixtures thereof, with
 (b) a compound selected from the group consisting of urea alkylene bisurea, thiourea, alkylene bisthiourea and mixtures thereof,
the improvement which comprises carrying out the reaction under such conditions that the reaction mixture includes about 5 to 50 mole percent of a hindered dicarboxylic acid based on the total moles of urea plus diacid, the hindered dicarboxylic acid having the structural formula:

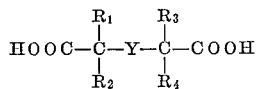

wherein $R_1$, $R_2$, $R_3$ and $R_4$ are selected from the group consisting of $C_1$–$C_5$ alkyl hydrocarbons and mixtures thereof and Y is selected from the group consisting of —$(CH_2)_n$— where $n=2$–20,

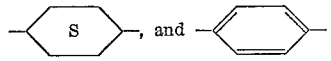

the mole ratio of diamines to urea plus diacid being about 1:1 to about 3.0:1.

2. A process for preparing a polyurea which comprises reacting:
 (a) at least one diamine selected from the group consisting of aliphatic diamines, diamines containing an aromatic neuclus, diamines containing a cycloaliphatic nuclus and mixtures thereof with
 (b) a compound selected from the group consisting of urea, alkylene bisurea, thiourea or alkylene bisthiourea and mixtures thereof in the presence of
 (c) about 5 to 50 mole percent of a hindered dicarboxylic acid based on the total moles of urea plus diacid, the hindered dicarboxylic acid having the structural formula:

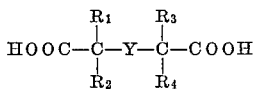

wherein $R_1$, $R_2$, $R_3$ and $R_4$ are selected from the group consisting of $C_1$–$C_5$ alkyl hydrocarbons and mixtures thereof and Y is selected from the group consisting of —$(CH_2)_n$— where $n=2$–20

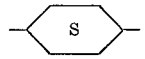

and

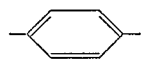

the mole ratio of diamines to urea plus diacid being 1:1 to about 3.0:1, the reaction being carried out by:

(1) heating the diamine-urea-diacid mixture in the presence of an inert gas at a temperature from about 90° C. to about 140° C. until ammonia evolution has essentially subsided;
 (2) gradually increasing the temperature to about 140° to 200° C., the heating being continued until deammoniation is essentially completed; and
 (3) thereafter heating to about 200° C. to 290° C. until polymerization is complete.

3. The process of claim 2 wherein the reaction is carried out by continuously and gradually raising the temperature from a minimum of 90° C. to a maximum of about 290° C.

4. The process of claim 2 wherein the initial heating step is carried out at a temperature from about 120° C. to 130° C., the second heating step being carried out at a temperature from 150° C. to 165° C. and the final polymerization step is carried out at a temperature of about 250° C. to 280° C.

5. The process of claim 1 wherein the hindered dicarboxylic acid is 2,2,6,6-tetramethylpimelic acid.

6. The process of claim 2 wherein the hindered dicarboxylic acid is 2,2,6,6-tetramethylpimelic acid.

7. The process of claim 2 wherein the diamine is present in the reaction mixture in an amount ranging from about 1.2 to about 2.5 moles per mole of urea or urea compounds or mixtures thereof.

8. The process of claim 2 in which the diamines are selected from the group consisting of 1,6-hexanediamine, 4,7-dioxa-1,10-decanediamine, N-methyl-N-bis (γ-propylamine), 1,4-phenylene-bis (β-ethylamine), 1,3-phenylene-bis (methylamine), 1,4-cyclohexane-bis (methylamine), and mixtures thereof.

9. The product of claim 2.

10. The process of claim 2 wherein the urea compound is urea.

11. The process of claim 2 wherein the diamines are selected from the group consisting of hexamethylenediamine, 4,7,10-trioxa-1,13-tridecanediamine and mixtures thereof.

References Cited

UNITED STATES PATENTS 3,054,477  9/1962  Inaba et al. _____ 260—77.5
3,199,793  1/1964  Inaba et al. _____ 260—77.5
3,133,897  5/1964  Inaba et al. _____ 260—45.85

OTHER REFERENCES

First addition to French Patent 891,508 to Thueringische Zellerolle A-G, Aug. 10, 1945, pp. 1 to 3.

DONALD E. CZAJA, Primary Examiner

H. S. COCKERAM, Assistant Examiner

U.S. Cl. X.R.

260—29.1, 30.6, 32.2, 32.6, 33.4, 45.7, 45.9